United States Patent [19]

Sizemore et al.

[11] Patent Number: 5,355,610
[45] Date of Patent: Oct. 18, 1994

[54] DEVICES FOR SUPPORTING A FISHING ROD ADAPTED TO SIGNAL THE USER WHEN A FISH BITES A HOOK

[76] Inventors: Earl E. Sizemore; Eddie Sizemore, both of 981 Blue Ball Rd., Elkton, Md. 21921

[21] Appl. No.: 144,355

[22] Filed: Nov. 1, 1993

[51] Int. Cl.$^5$ ............................................. A01K 85/01
[52] U.S. Cl. ........................................ 43/17; 43/21.2
[58] Field of Search ...................... 43/15, 16, 17, 21.2

[56] References Cited

U.S. PATENT DOCUMENTS

| | | | |
|---|---|---|---|
| 2,817,176 | 12/1957 | Harshbarger | 43/17 |
| 3,359,672 | 12/1967 | Schwartz | 43/17 |
| 3,555,716 | 1/1971 | Long | 43/17 |
| 3,618,068 | 11/1971 | Sloan | 43/17 |
| 3,903,633 | 9/1975 | Hutcherson | 43/17 |
| 3,992,798 | 11/1976 | Schmitt | 43/17 |

*Primary Examiner*—P. Austin Bradley
*Assistant Examiner*—James Miner
*Attorney, Agent, or Firm*—Michael J. Colitz, Jr.

[57] ABSTRACT

Devices for supporting a fishing rod with a hook adapted to signal the user when a fish bites a hook comprising a rectangular support box. The box has a battery positioned therein. A support assembly is provided comprising a generally C-shaped rearward support component and a U-shaped forward support component. The U-shaped component is located above the C-shaped component whereby when a fishing rod is located in contact with the C-shaped and U-shaped support components, the rod will be maintained at a proper angular orientation for fishing. A crossbar supports the U-shaped support with a pair of springs attached to the box with their upper ends urging the crossbar and U-shaped component upwardly. An adjustable trigger is adapted to be contacted and depressed by a fishing rod supported in the support assembly when a fish bites the hook of the fishing rod. A horn is mounted adjacent to the box and operatively coupled with the battery and trigger and is adapted to be sounded upon the biting of the hook.

5 Claims, 3 Drawing Sheets

DEVICES FOR SUPPORTING A FISHING ROD ADAPTED TO SIGNAL THE USER WHEN A FISH BITES A HOOK

BACKGROUND OF THE INVENTION

1. Field of the Invention

The present invention relates to devices for supporting a fishing rod adapted to signal the user when a fish bites a hook and more particularly pertains to mechanisms to sound a horn when a supported fishing rod has been tipped by biting of the hook.

2. Description of the Prior Art

The use of fishing rod holders is known in the prior art. More specifically, fishing rod holders heretofore devised and utilized for the purpose of holding the rod of a fisherman are known to consist basically of familiar, expected, and obvious structural configurations, notwithstanding the myriad of designs encompassed by the crowded prior art which has been developed for the fulfillment of countless objectives and requirements.

A large number of devices are known for holding fishing rods and for signaling when a fish has bitten the hook and struck the user's fishing rod. By way of example, U.S. Pat. No. 4,202,126 to Pietrenka discloses a fish strike detecting apparatus.

U.S. Pat. No. 4,552,318 to Durham discloses a fish strike detector.

U.S. Pat. No. 4,633,608 to Savarino discloses a fish strike detector.

U.S. Pat. No. 5,063,373 to Lindsley discloses a fishing rod holder with a fish alert.

U.S. Pat. No. 5,125,181 to Brinton discloses a fish strike detector.

U.S. Pat. No. 5,185,949 to Patterson discloses a fish alert.

In this respect, devices for supporting a fishing rod adapted to signal the user when a fish has bit the hook according to the present invention substantially depart from the conventional concepts and designs of the prior art, and in doing so provides an apparatus primarily developed for the purpose of sounding a horn when a supported fishing rod has been tipped by biting of the bait.

Therefore, it can be appreciated that there exists a continuing need for new and improved devices for supporting a fishing rod adapted to signal the user when a fish has bit the hook which can be used for sounding a horn when a supported fishing rod has been tipped by biting of the bait. In this regard, the present invention substantially fulfills this need.

SUMMARY OF THE INVENTION

In view of the foregoing disadvantages inherent in the known types of fishing rod holders now present in the prior art, the present invention provides improved devices for supporting a fishing rod adapted to signal the user when a fish has bit the hook. As such, the general purpose of the present invention, which will be described subsequently in greater detail, is to provide a new and improved device for supporting a fishing rod adapted to signal the user when a fish has bit the hook and methods which have all the advantages of the prior art and none of the disadvantages.

To attain this, the present invention essentially comprises a a new and improved device for supporting a fishing rod adapted to signal the user when a fish bites a hook comprising, in combination a rectangular support box having an upper surface, a lower surface, an outboard surface, an inboard surface and vertical side surfaces coupled therebetween, the box having a battery positioned therein a support assembly comprising a generally c-shaped rearward support component positioned rearwardly of the inboard surface and adapted to receive the rear of a handle of a fishing rod and a u-shaped forward support component positioned forwardly of the outboard surface, the lower end of the second component being located above the lower end of the first component whereby when a fishing rod is located in contact with the secondary and first supports, it will be maintained at a proper angular orientation for fishing a crossbar supporting the second support with a pair of springs having their lower ends attached to the box and their upper ends urging the crossbar and second component upwardly an adjustable trigger having its upper end located along the longitudinal axis of the box at a location above the lower edge of the second support and forwardly thereof to be contacted and depressed by a fishing rod supported in the support assembly when a fish bites the bait of the fishing rod, the trigger having a lower end pivotally coupled to the upper surface of the box and with an upturned switch contact on the side of the trigger opposite from the upper end a horn mounted adjacent to the box and operatively coupled with the battery and trigger and adapted to be sounded upon the circuit having been made following the biting of the bait an on/off switch in the box adapted to inactivate the electrical circuit irrespective of their orientation of the fishing rod; and a hollow tube extending downwardly from the lower face of the box adapted to be received on a post.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is a further object of the present invention to provide new and improved devices for supporting a fishing rod adapted to signal the user when a fish bites a hook which is of a durable and reliable construction.

An even further object of the present invention is to provide new and improved devices for supporting a fishing rod adapted to signal the user when a fish bites a hook which is susceptible of a low cost of manufacture with regard to both materials and labor, and which accordingly is then susceptible of low prices of sale to the consuming public, thereby making such devices for supporting a fishing rod adapted to signal the user when a fish bites a hook economically available to the buying public.

Still yet another object of the present invention is to provide new and improved devices for supporting a fishing rod adapted to signal the user when a fish bites a hook which provides in the apparatuses and methods of the prior art some of the advantages thereof, while simultaneously overcoming some of the disadvantages normally associated therewith.

Lastly, it is an object of the present invention to provide devices for supporting a fishing rod adapted to signal the user when a fish bites a hook comprising, in combination, rectangular support box having an upper surface, a lower surface, an outboard surface, an inboard surface and vertical side surfaces coupled therebetween, the box having a battery positioned therein a support assembly comprising a generally c-shaped rearward support component positioned rearwardly of the inboard surface and adapted to receive the rear of a handle of a fishing rod and a u-shaped forward support component positioned forwardly of the outboard surface, the lower end of the second component being located above the lower end of the first component whereby when a fishing rod is located in contact with the secondary and first supports, it will be maintained at a proper angular orientation for fishing a crossbar supporting the second support with a pair of springs having their lower ends attached to the box and their upper ends urging the crossbar and second component upwardly, an adjustable trigger having its upper end located along the longitudinal axis of the box at a location above the lower edge of the second support and forwardly thereof to be contacted and depressed by a fishing rod supported in the support assembly when a fish bites the bait of the fishing rod, the trigger having a lower end pivotally coupled to the upper surface of the box and with an upturned switch contact on the side of the trigger opposite from the upper end a horn mounted adjacent to the box and operatively coupled with the battery and trigger and adapted to be sounded upon the circuit having been made following the biting of the bait.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
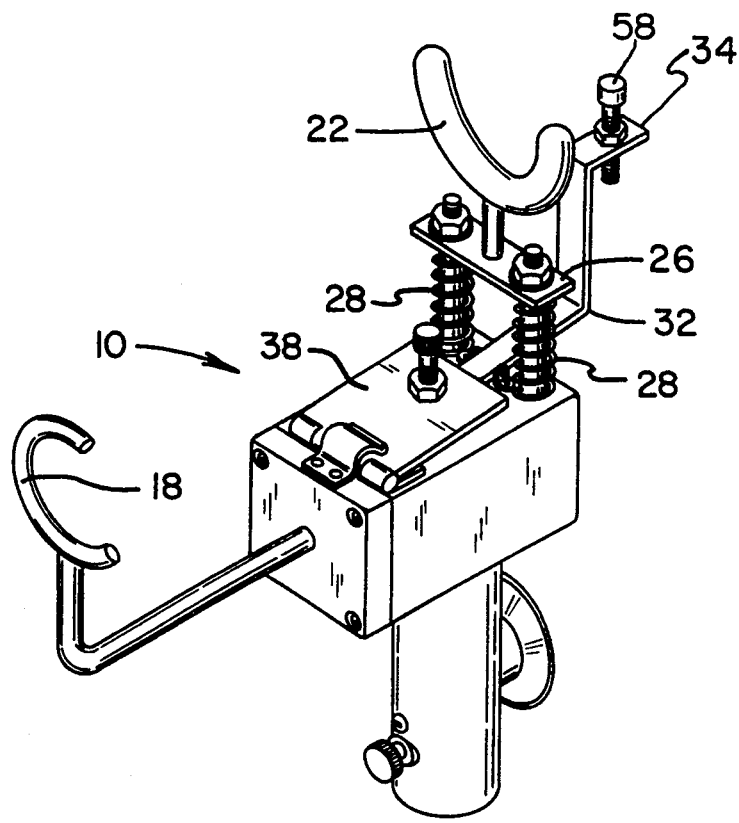
FIG. 1 is a perspective illustration of the preferred embodiment of the devices for supporting a fishing rod adapted to signal the user when a fish bites a hook constructed in accordance with the principles of the present invention.

With reference now to the drawings, and in particular to FIG. 1 thereof, the preferred embodiment of the new and improved devices for supporting a fishing rod adapted to signal the user when a fish has bit the hook embodying the principles and concepts of the present invention and generally designated by the reference numeral 10 will be described.

Figure 2:
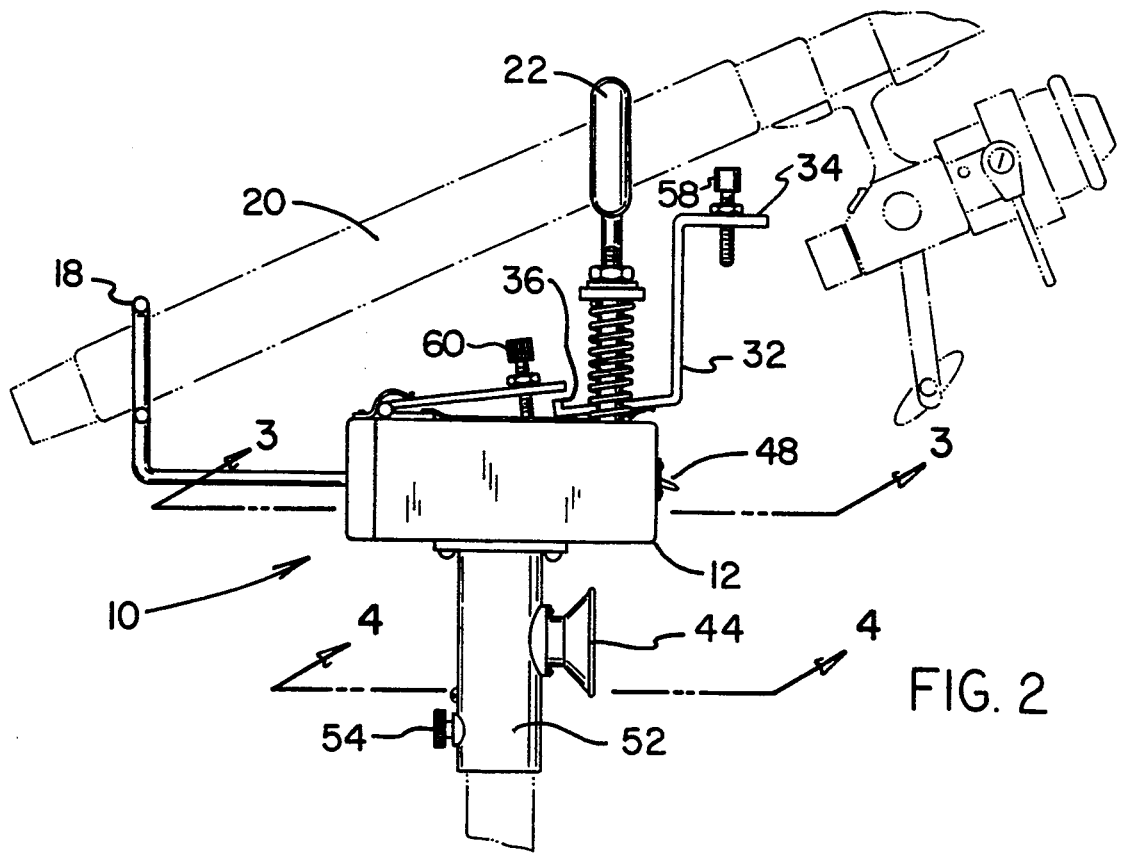
FIG. 2 is a side elevational view of the device as shown in FIG. 1.
Figure 3:
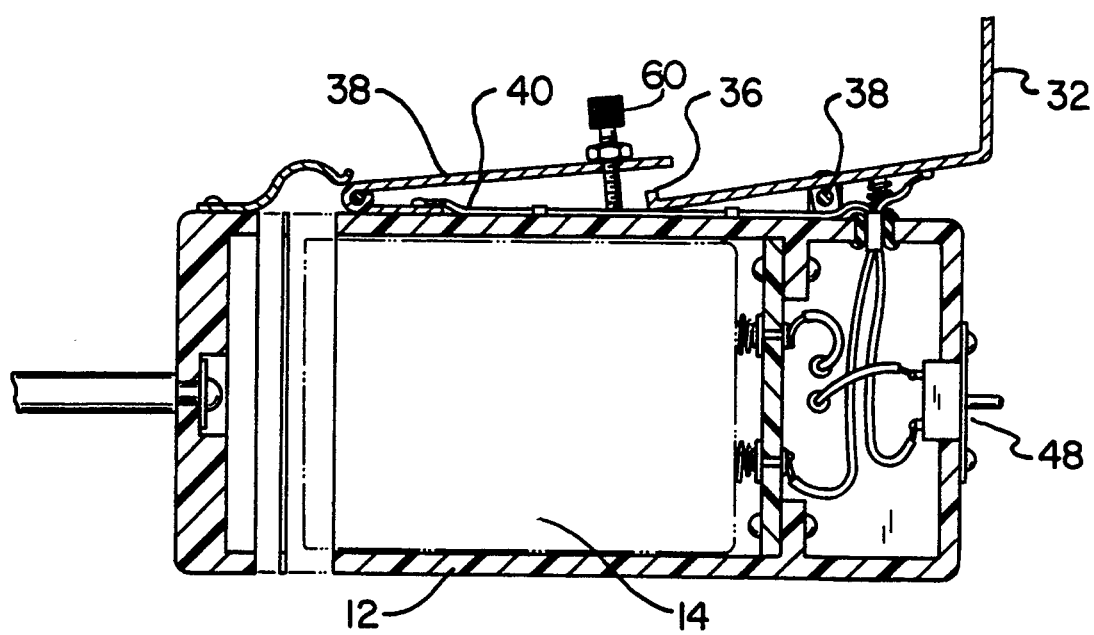
FIG. 3 is a cross sectional view taken along line 3—3 of FIG. 2.
Figure 4:
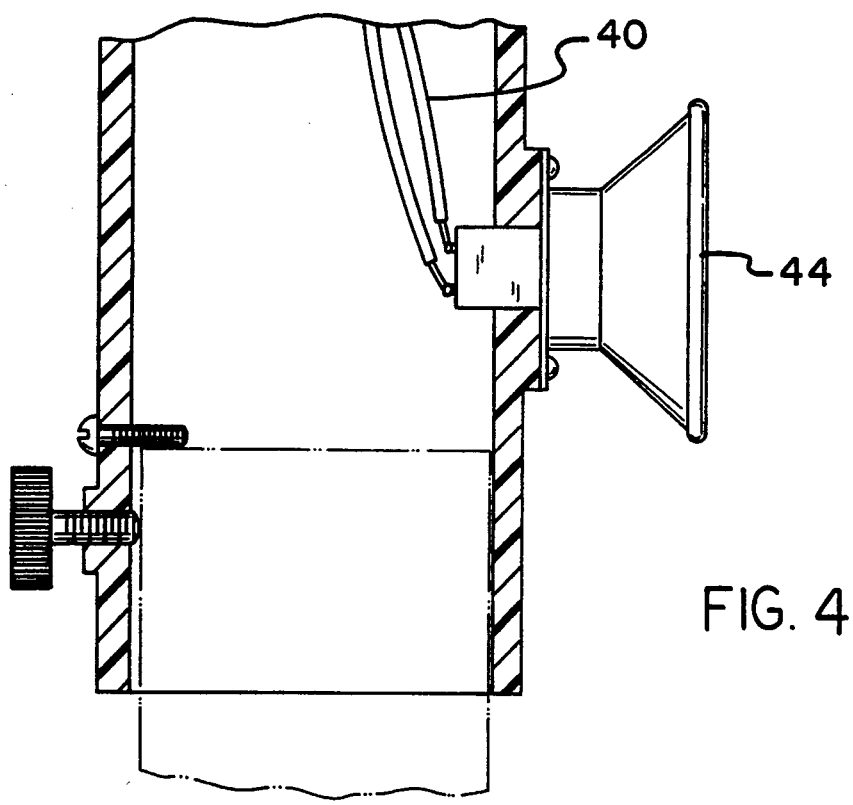
FIG. 4 is a cross sectional view taken along line 4—4 of FIG. 2.
Figure 5:
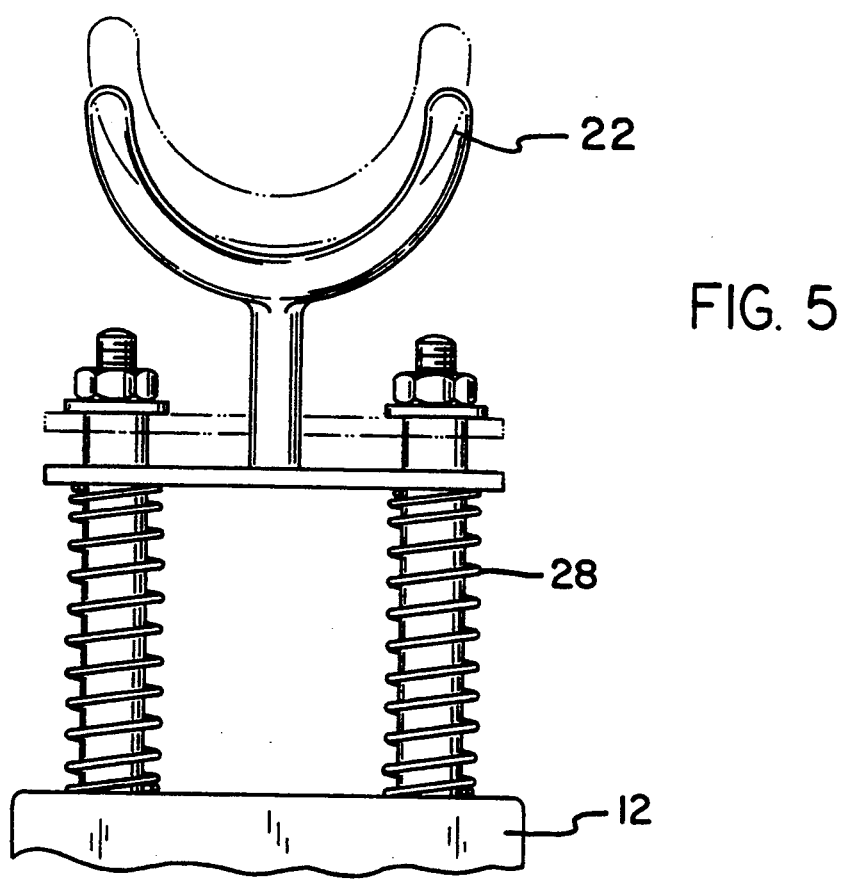
FIG. 5 is a front elevational view of the forward rod supporting mechanisms of FIGS. 1 and 2.
Figure 6:
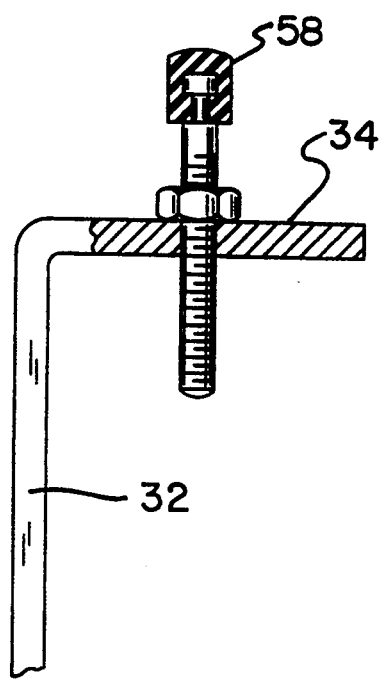
FIG. 6 is an enlarged side elevational view of the trigger and adjusting mechanisms of FIGS. 1 and 2.

More specifically, it will be noted with particular reference to FIGS. 1 and 2 there is shown the device 10 for supporting a fishing rod adapted to signal the user when a fish bites a hook. The central component of the device is a rectangular support box 12 having an upper surface, a lower surface, an outboard surface, an inboard surface and vertical side surfaces coupled therebetween. The box 12 has a battery 14 positioned therein.

The next main component of the device 10 is a support assembly. The support assembly comprises a generally c-shaped support 18. Such support is located rearwardly of the inboard surface of the box and is adapted to receive the rear of a handle of a fishing rod 20. A second support component 22 is positioned forwardly of the outboard surface of the box. The second support component 22 includes a generally u-shaped member. Its lower end is located above the lower end of the first generally c-shaped component. Consequently, when a fishing rod 20 is located in contact with the secondary and first support component, it will be maintained at a proper angular orientation for fishing. Note FIG. 2.

A crossbar 26 is provided for supporting the second support component 22. Therebeneath are a pair of springs 28. The springs have their lower ends attached to the box and their upper ends resiliently urging the crossbar and second support component upwardly.

An adjustable trigger 32 is next provided. The trigger has its upper end 34 located along the longitudinal axis of the box at a location above the lower edge of the second support component and forwardly thereof. It is adapted to be contacted and depressed by a fishing rod 20 supported in the support assembly when a fish strikes the bait of the fishing rod. The trigger 32 has a lower end 36 pivotally coupled through a pivot rod 38 to the upper surface of the box. The upper end includes an upturned switch contact on the side of the trigger opposite from the opposite from the upper end 34. Upward movement of the lower end 36, as caused by downward movement of the upper end 34, causes an electrical connector 40 to be contacted to function with wires 42 to close a circuit.

A horn 44 formed in the outboard surface of the box 12 is operatively coupled with the battery and adapted to be sounded upon the circuit having been made following the strike of a fish.

Also within the circuit is an on/off switch 48. The switch is located on the outboard surface of the box adapted to inactivate the electrical components irrespective of the orientation of the fishing rod.

Lastly provided is a hollow tube 52. Such tube extends downwardly from the lower surface of the box 12. The tube is adapted to be received on a post for support purposes. A thumb screw 54 extends through the tube for securement purposes.

Adjustment of the device is effected through two screws 58 and 60. The first screw 58 is threadedly mounted in the upper end of the trigger 32. This screw varies the extent to which the fishing rod must be tipped before the device 10 is activated. The second screw 60 is threadedly mounted in the upper end of the electrical connector 40 to vary the extent to which the trigger must be tipped before the circuit is closed. These screws may be adjusted to the preference of a user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved device for supporting a fishing rod with a hook adapted to signal the user when a fish has bit the hook comprising, in combination:

a rectangular support box having an upper surface, a lower surface, an outboard surface, an inboard surface and vertical side surfaces coupled therebetween, the box having a battery positioned therein;

a support assembly comprising a generally C-shaped rearward support component positioned rearwardly of the inboard surface and adapted to receive the rear of a handle of a fishing rod and a U-shaped forward support component positioned rearwardly of the outboard surface, the U-shaped component being located above the C-shaped component whereby when a fishing rod is located in contact with the C-shaped component and U-shaped component, the rod will be maintained at a proper angular orientation for fishing;

a crossbar supporting the U-shaped component with a pair of springs having their lower ends attached to the box and their upper ends urging the crossbar and U-shaped component upwardly;

an adjustable trigger having its upper end located along the longitudinal axis of the box at a location above the lower edge of the U-shaped component and forwardly thereof to be contacted and depressed by a fishing rod supported in the support assembly when a fish bites the hook of the fishing rod, the trigger having a lower end pivotally coupled to the upper surface of the box and with an upturned switch contact on the end of the trigger opposite from the upper end;

a horn mounted adjacent to the box and operatively coupled with the battery and trigger and adapted to be sounded upon the biting of the hook;

an on/off switch in the box adapted to inactivate the horn irrespective of the orientation of the fishing rod; and a hollow tube extending downwardly from the box adapted to be received on a post.

2. A device for supporting a fishing rod with a hook adapted to signal the user when a fish has bit the hook comprising:

a rectangular support box having an upper surface, a lower surface, an outboard surface, an inboard surface and vertical side surfaces coupled therebetween, the box having a battery positioned therein;

a support assembly comprising a generally C-shaped rearward support component positioned rearwardly of the inboard surface and adapted to receive the rear of a handle of a fishing rod and a U-shaped forward support component positioned rearwardly of the outboard surface, the U-shaped component being located above the C-shaped component whereby when a fishing rod is located in contact with the C-shaped component and U-shaped component, the rod will be maintained at a proper angular orientation for fishing;

a crossbar supporting the U-shaped component with a pair of springs having their lower ends attached to the box and their upper ends urging the crossbar and U-shaped component upwardly;

an adjustable trigger having its upper end located along the longitudinal axis of the box at a location above the lower edge of the U-shaped component and forwardly thereof to be contacted and depressed by a fishing rod supported in the support assembly when a fish bites the hook of the fishing rod, the trigger having a lower end pivotally coupled to the upper surface of the box and with an upturned switch contact on the end of the trigger opposite from the upper end; and a horn mounted adjacent to the box and operatively coupled with the battery and trigger and adapted to be sounded upon the biting of the hook.

3. The device as set forth in claim 2 and further including:

an on/off switch in the box adapted to couple the battery and horn irrespective of the orientation of the fishing rod.

4. The device as set forth in claim 2 and further including a hollow tube extending downwardly from the box adapted to be received on a post.

5. The device as set forth in claim 2 and further including:

adjustment means associated with each end of the trigger.

* * * * *